United States Patent
Cheng

(10) Patent No.: US 9,787,187 B2
(45) Date of Patent: Oct. 10, 2017

(54) DUAL-CONSTANT-TIME BUCK-BOOST SWITCHING REGULATOR AND CONTROL CIRCUIT AND METHOD THEREOF

(71) Applicant: RICHTEK TECHNOLOGY CORPORATION, Zhubei, HsinChu (TW)

(72) Inventor: Hung-Yu Cheng, Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/217,102

(22) Filed: Jul. 22, 2016

(65) Prior Publication Data

US 2017/0201178 A1    Jul. 13, 2017

(30) Foreign Application Priority Data

Jan. 8, 2016 (TW) .............................. 105100475 A

(51) Int. Cl.
  *H02M 3/158* (2006.01)
  *H02M 1/08* (2006.01)

(52) U.S. Cl.
  CPC ........... *H02M 3/1582* (2013.01); *H02M 1/08* (2013.01)

(58) Field of Classification Search
  CPC .............................. H02M 3/1582; H02M 1/08
  See application file for complete search history.

(56) References Cited

U.S. PATENT DOCUMENTS

| 6,166,527 | A | 12/2000 | Dwelley et al. | |
|---|---|---|---|---|
| 7,176,667 | B2 | 2/2007 | Chen et al. | |
| 2006/0176036 | A1* | 8/2006 | Flatness | H02M 3/1582 323/282 |
| 2008/0284397 | A1* | 11/2008 | Chang | H02M 3/157 323/283 |
| 2010/0045254 | A1* | 2/2010 | Grant | H02M 3/1582 323/283 |
| 2011/0156685 | A1 | 6/2011 | Chen et al. | |
| 2011/0187336 | A1* | 8/2011 | Wu | G05F 1/10 323/282 |
| 2015/0229215 | A1* | 8/2015 | Choudhary | H02M 1/14 323/271 |
| 2015/0362937 | A1* | 12/2015 | Wang | H02M 3/156 323/281 |
| 2016/0315535 | A1* | 10/2016 | Ouyang | H02M 3/1582 |
| 2017/0005577 | A1* | 1/2017 | Chen | H02M 3/1582 |

\* cited by examiner

*Primary Examiner* — Fred E Finch, III
(74) *Attorney, Agent, or Firm* — Tung & Associates

(57) ABSTRACT

The present invention provides a dual constant time buck-boost switching regulator, and a control circuit and a method thereof. The buck-boost switching regulator converts an input voltage to an output voltage and it includes a buck circuit and a boost circuit. The buck circuit includes an inductor, a buck power switch and a buck power device. The boost circuit includes the inductor, a boost power switch and a boost power device. The present invention controls the buck power switch to be OFF by a constant OFF time in the buck conversion mode, and controls the boost power switch to be ON by a constant ON time in the boost conversion mode. An offset signal ensures that the buck-boost regulator operates only in pure buck conversion mode and pure boost conversion mode, but does not need to operate in a buck-boost conversion mode.

13 Claims, 14 Drawing Sheets

Average Current Mode

DUAL-CONSTANT-TIME BUCK-BOOST SWITCHING REGULATOR AND CONTROL CIRCUIT AND METHOD THEREOF

CROSS REFERENCE

The present invention claims priority to TW 105100475, filed on Jan. 8, 2016.

BACKGROUND OF THE INVENTION

Field of Invention

The present invention relates to a dual constant time buck-boost switching regulator. Particularly, it relates to a current mode or voltage mode buck-boost switching regulator with two sets of constant time. The present invention also relates to a control circuit and a control method of the dual constant time buck-boost switching regulator.

Description of Related Art

FIG. 1A shows a prior art method of controlling a buck-boost switching regulator disclosed in U.S. Pat. No. 6,166,527. The constant time buck-boost switching regulator comprises an inductor L, four power switches A, B, C, and D, and a control circuit 20. The control circuit 20 controls the operation of the power switches A, B, C and D to convert an input voltage Vin to an output voltage Vout, wherein the input voltage Vin may be higher or lower than the output voltage Vout, and hence the regulator may need to operate in buck conversion (i.e. step down) or boost conversion (i.e. step up). In the control circuit 20, an error amplifier 22 compares a feedback signal FB (which relates to the output voltage Vout) with a reference voltage Vref to generate an error amplified signal Vea. PWM (Pulse Width Modulation) comparators 24 and 25 compare the error amplified signal Vea with voltage wave signals VX and VY respectively. A logic circuit 29 generates switch control signals VA, VB, VC, and VD to control the power switches A, B, C, and D respectively according to the comparing results from the comparator 24 and 25.

FIG. 1B shows waveforms of the error amplified signal Vea, the voltage wave signals VX and VY, and the switch control signals VA, VB, VC and VD. When the error amplified signal Vea is between level V1 and level V2, the regulator operates in a pure buck conversion mode. When the error amplified signal Vea is between level V2 and level V3, the regulator operates in a buck-boost conversion mode. When the error amplified signal Vea is between level V3 and level V4, the regulator operates in a pure boost conversion mode. When the regulator is operating in the pure buck conversion mode, the power switch C is kept OFF and the power switch D is kept ON. When the regulator is operating in the pure boost conversion mode, the power switch A is kept ON and the power switch B is kept OFF. When the regulator is operating in the buck-boost conversion mode, as shown in the FIG. 1B, the switch control signals VA and VB are generated according to the relationship between the error amplified signal Vea and the voltage wave signal VX, and the switch control signals VC and VD are generated according to the relationship between the error amplified signal Vea and the voltage wave signal VY; in other words, the regulator performs a mixed combination of boost conversion (the power switches C and D operating) and buck conversion (the power switches A and B operating).

The aforementioned prior art buck-boost regulator includes the pure boost conversion mode, the pure buck conversion mode and the buck-boost conversion mode, wherein the buck-boost conversion mode requires an operation range, that is, level V2 must be lower than level V3; otherwise, the prior art system will be unstable. When operating in the buck-boost conversion mode, all four switches A, B, C and D are switching in one cycle period, and this will increase the switching loss as well as the power consumption. The prior art has a drawback that there is a conflict between meeting the stability requirement and keeping the power loss low.

FIG. 2A shows the circuit structure of another prior art U.S. Pat. No. 7,176,667. This prior art uses the error amplifier 22 to generate two error amplified signals Vea1 and Vea2, one of which is selected to be compared with a voltage wave signal OSC by the PWM comparators 24. The circuit further includes a constant pulse width generator 26. Based on the outputs from the PWM comparator 24 and the constant pulse width generator 26, the logic circuit 29 generates the switch control signals VA, VB, VC, and VD to control the power switches A, B, C, and D respectively.

Referring to FIG. 2B, there are four conversion modes in U.S. Pat. No. 7,176,667: besides the pure buck conversion mode M1 and the pure boost conversion mode M4, a transient buck conversion mode M2 and a transient boost conversion mode M3 are provided between M1 and M4. The switch control signals VA and VB follow the output of the PWM comparators 24 and the switch control signals VC and VD have constant pulse widths in the transient buck conversion mode M2. The switch control signals VC and VD follow the output of the PWM comparators 24 and the switch control signals VA and VB have constant pulse widths in the transient boost conversion mode M3.

The aforementioned prior art U.S. Pat. No. 7,176,667 has the following drawbacks: four conversion modes require more complicated control mechanism; with the two transition modes (M2 and M3), it means that there is more chance for the circuit to operate in the transient modes in which all the four power switches will be switching and will increase the switching loss and the power consumption.

Besides, both the prior art regulators shown in U.S. Pat. Nos. 6,166,527 and 7,176,667 are based on fixed frequency operation. The transient response of this kind of technology is usually slower due to fixed switching frequency which limits the bandwidth. To realize the aforementioned prior art regulators in PFM mode (Pulse Frequency Modulation), extra complicated circuits are required to cope with conditions such as a very low load current, and in some cases it even cannot operate in PFM mode when for example the input voltage Vin is close to the output voltage Vout. FIG. 3 shows a prior art TPS63020 controller which similarly operates with fixed frequency and includes a buck-boost overlap control which is similar to the aforementioned buck-boost mode or transient modes. This prior art of FIG. 3 uses an average current mode which needs a slope compensation circuit to suppress the tendency of sub-harmonic oscillation, and thus the circuitry becomes even more complicated.

FIG. 4A shows the structure of another prior art US 2011/0156685A1. The buck-boost regulator includes an inductor L, power switches A, B, C, and D, and a control circuit 30. The control circuit 30 controls the switching of the power switches A, B, C, and D to convert the input voltage Vin to the output voltage Vout. The error amplifier 32 of the control circuit 30 compares a feedback signal FB (which relates to the output voltage Vout) with a reference voltage Vref to generate an error amplified signal. The PWM comparator 34 compares the error amplified signal with an inductor current related signal. The ON time generation circuit 37 generates an ON time for the switches according to the comparing result of the PWM comparator 34. The driver circuit 39 generates switch control signals VA, VB, VC, and VD to control the power switches A, B, C, and D according to the ON time. This prior art has a feature that only one PWM comparator 34 is needed because only one ON time is required. Though the structure of this prior art is simple for implementing a buck-boost PWM regulator, this prior art has a drawback that all of the power switches A, B, C, and D are switching in each operating cycle. As shown in FIGS. 4B and 4C, the power switches A and C are turned ON first (the current direction is as shown by the solid line in FIG. 4C), and then the power switches B and D are turned ON (the current direction is as shown by the dashed line in FIG. 4C), and such operations repeat. Hence, the switching loss is much higher.

To overcome the drawbacks of the aforementioned prior art circuits, the present invention provides a constant time buck-boost switching regulator which has fast transient response, which does not need slope compensation, which can cooperate in PFM without extra complicated circuits, and which furthermore can operate in pure buck conversion mode and pure boost conversion mode without a buck-boost conversion mode or a transient buck mode or a transient boost mode.

SUMMARY OF THE INVENTION

From one perspective, the present invention provides a constant time buck-boost switching regulator, comprising: a buck circuit, which includes: an inductor, having a first end and a second end; a first buck power switch, having one end coupled to the first end of the inductor and another end coupled to an input voltage; and a buck power device, having one end coupled to the first end of the inductor and another end coupled to ground; a boost circuit, which includes: the inductor; a first boost power switch, having one end coupled to the second end of the inductor and another end coupled to ground; and a boost power device, having one end coupled to the second end of the inductor and another end coupled to an output voltage; and a control circuit, configured to operably generate a first constant time and a second constant time; wherein the first constant time is a constant OFF time for controlling the buck circuit such that the first buck power switch is OFF during the constant OFF time, and wherein the second constant time is a constant ON time for controlling the boost circuit such that the first boost power switch is ON during the constant ON time.

In one embodiment, the buck power device or the boost power device in the aforementioned constant time buck-boost switching regulator may be a switch or a diode.

From another perspective, the present invention provides a control circuit, which is configured to operably control a constant time buck-boost switching regulator, wherein the constant time buck-boost switching regulator comprises: a buck circuit, which includes: an inductor, having a first end and a second end; a first buck power switch, of which one end coupled to the first end of the inductor and another end coupled to an input voltage; a buck power device, of which one end coupled the first end of the inductor and another end coupled to ground; a boost circuit, which includes: the inductor; a first boost power switch, of which one end coupled to the second end of the inductor and another end coupled to ground; a boost power device, of which one end coupled the second end of the inductor and another end coupled to an output voltage; the control circuit includes: an error amplifier circuit, configured to operably compare a feedback signal related to the output voltage and a reference voltage to generate an error amplified signal; a first PWM comparator circuit, configured to operably compare a first inductor current related signal or a first ramp signal to the error amplified signal; a second PWM comparator circuit, configured to operably compare a second inductor current related signal or a second ramp signal to the error amplified signal; an offset signal generator, configured to operably generate an offset signal such that the difference between the first inductor current related signal or the first ramp signal and the second inductor current related signal or the second ramp signal corresponds to the level of the offset signal; a first constant time generator, configured to operably generate a first constant time according to a comparing output of the first PWM comparator; a second constant time generator, configured to operably generate a second constant time according to a comparing output of the second PWM comparator; a first driver circuit, configured to operably generate a buck switch control signal to control the first buck power switch according to an output of the first constant time generator; and a second driver circuit, configured to operably generate a boost switch control signal to control the first boost power switch according to an output of the second constant time generator; wherein the first constant time is a constant OFF time and configured to operably control the buck circuit such that the first buck power switch is OFF during the time period of the constant OFF time; wherein the second constant time is a constant ON time and configured to operably control the boost circuit such that the first boost power switch is ON during the time period of the constant ON time.

In one embodiment, the offset signal is preferably larger than a peak-to-valley difference of the first inductor current related signal or the first ramp signal, such that the constant time buck-boost switching regulator operates only in a pure buck conversion mode or a pure boost conversion mode and does not operate in a buck-boost mode or a transient buck/boost mode.

From another perspective, the present invention provides a method for controlling a constant time buck-boost switching regulator, wherein the constant time buck-boost switching regulator comprises: a buck circuit, which includes: an inductor, having a first end and a second end; a first buck power switch, of which one end coupled to the first end of the inductor and another end coupled to an input voltage; a buck power device, of which one end coupled the first end of the inductor and another end coupled to ground; a boost circuit, which includes: the inductor; a first boost power switch, of which one end coupled to the second end of the inductor and another end coupled to ground; a boost power device, of which one end coupled the second end of the inductor and another end coupled to an output voltage; the method includes: generating a first constant time and a second constant time; controlling the buck circuit with the first constant time; and controlling the boost circuit with the second constant time; wherein the first constant time is a constant OFF time and configured to operably control the buck circuit such that the first buck power switch is OFF during the time period of the constant OFF time; wherein the second constant time is a constant ON time and configured to operably control the boost circuit such that the first boost power switch is ON during the time period of the constant ON time.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 5:
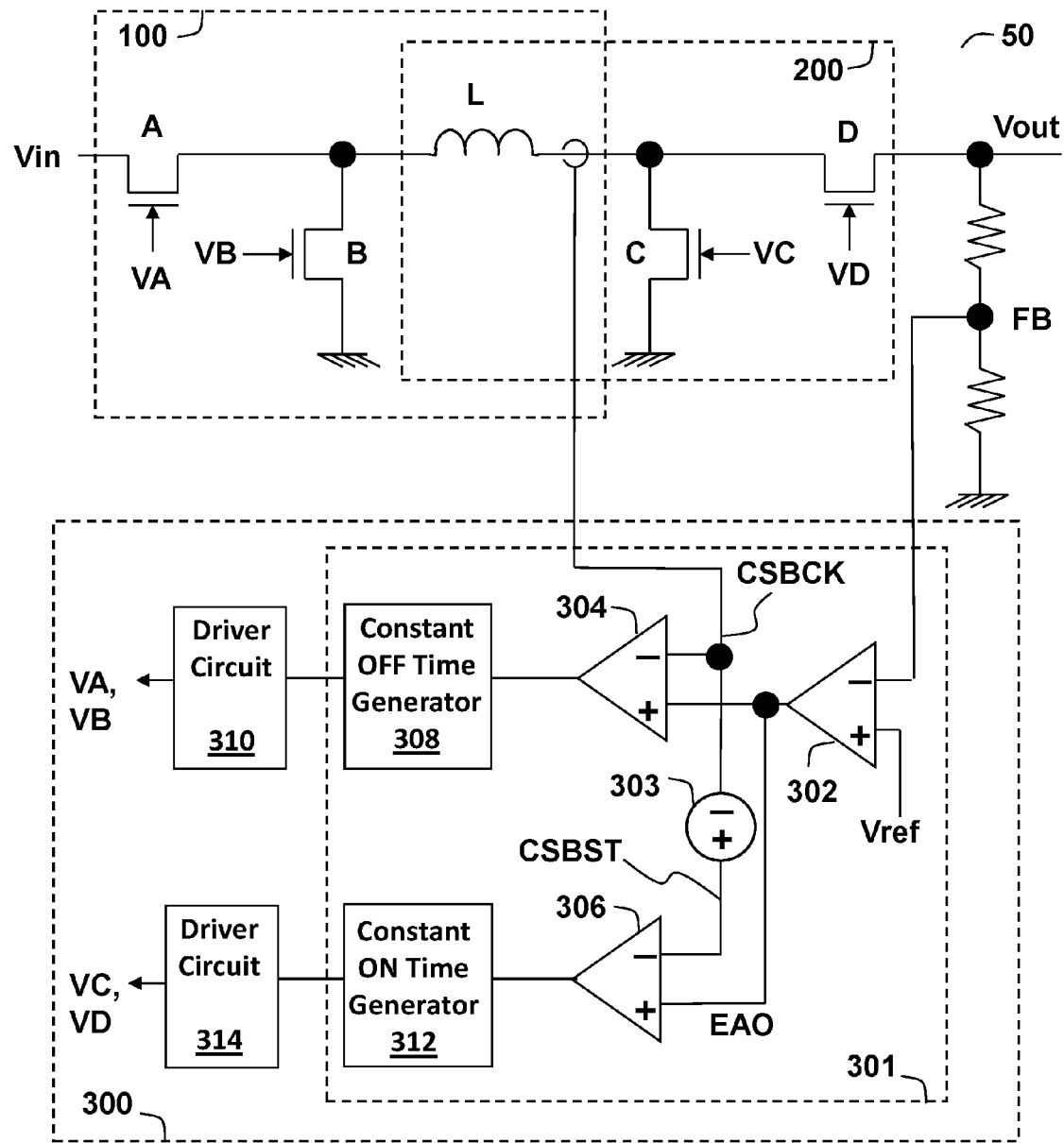
FIG. 5 shows one embodiment of the constant time buck-boost switching regulator according to the present invention.

Referring to FIG. 5, a first embodiment according to the present invention is illustrated by a current mode dual constant time structure. In this embodiment, the constant time buck-boost switching regulator 50 comprises a buck circuit 100, a boost circuit 200, and a control circuit 300. The buck circuit 100 includes an inductor L, power switches A, and B; the boost circuit 200 includes the inductor L, power switches C, and D; the control circuit 300 controls the operation of the power switches A, B, C, and D to convert an input voltage Vin to an output voltage Vout. In the control circuit 300, the error amplifier 302 compares the feedback signal FB (which relates to the output voltage Vout) with a reference voltage Vref to generate an error amplified signal EAO; a PWM comparator 304 compares the error amplified signal EAO with an inductor current related signal CSBCK. The control circuit 300 further adds an offset signal generated by an offset signal generator 303 to the inductor current related signal CSBCK and generates another inductor current related signal CSBST. The control circuit 300 includes another PWM comparator 306 which compares the error amplified signal EAO with the inductor current related signal CSBST. The constant OFF time generator 308 generates a constant OFF time for the power switches according to the output of the comparator 304. The driver circuit 310 generates switch control signals VA and VB to control the power switches A, and B respectively according to the constant OFF time. The constant ON time generator 312 generates a constant ON time for the power switches according to the output of the comparator 306. The driver circuit 314 generates switch control signals VC and VD to control the power switches C, and D respectively according to the constant ON time.

Figure 6A:
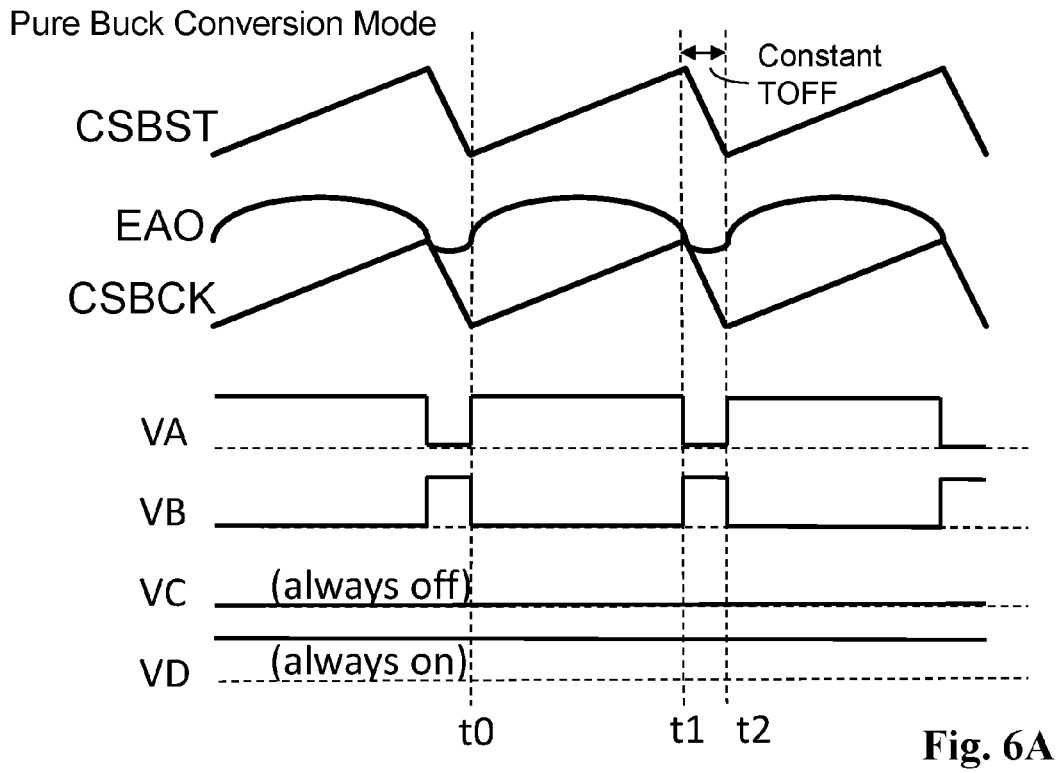
FIGS. 6A and 6B show signal waveforms corresponding to the circuits shown in FIG. 5.

Please refer FIG. 6A, which shows that the constant time buck-boost switching regulator 50 is operating in the pure buck conversion mode in which the error amplified signal EAO does not intersect the inductor current related signal CSBST and hence the switch control signal VC is constantly low such that the power switch C is constantly OFF, and the switch control signal VD is constantly high such that the power switch D is constantly ON. The power switch A is turned ON at time t0, whereby the inductor current related signal CSBCK starts to rise until the error amplified signal EAO intersects the inductor current related signal CSBCK at time t1. The power switch A is turned OFF at time t1 and keeps OFF for a period of constant OFF time TOFF. The power switch A is turned ON again at time t2, and the aforementioned operations repeat. This pure buck mode is a peak current mode.

Figure 6B:
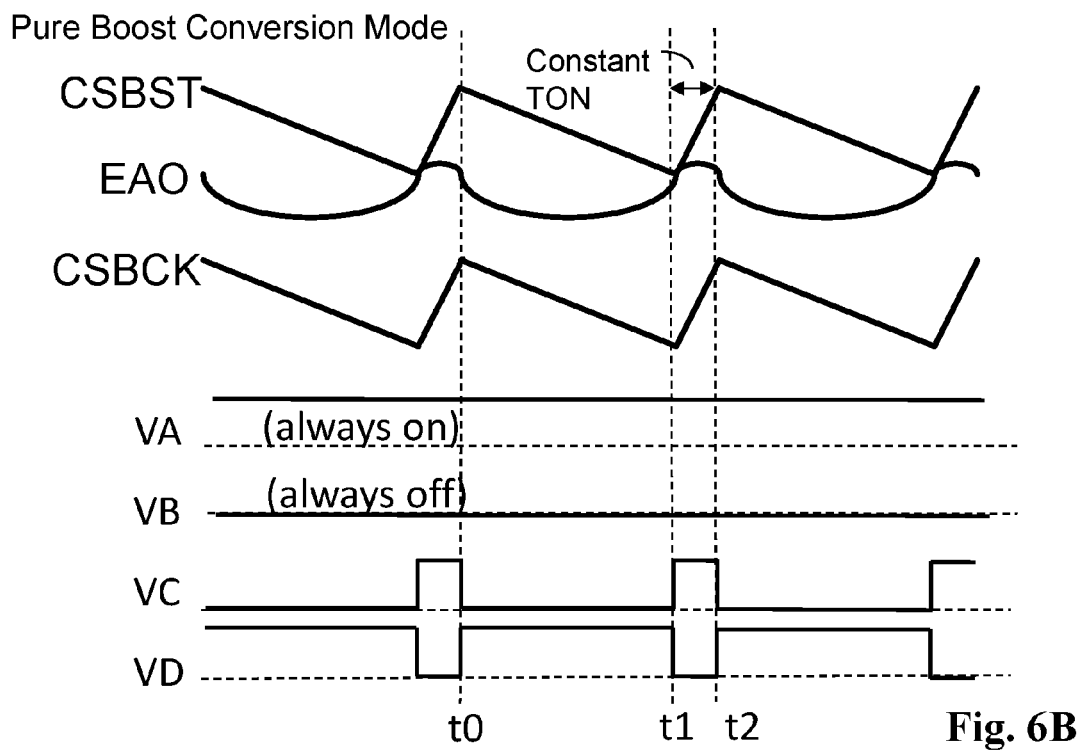

Please refer FIG. 6B, which shows that the constant time buck-boost switching regulator 50 is operating in the pure boost conversion mode in which the EAO does not intersect the inductor current related signal CSBCK and hence the switch control signal VB is constantly low such that the power switch B is constantly OFF, and the switch control signal VA is constantly high such that the power switch A is constantly ON. The power switch C is turned OFF at time t0, whereby the inductor current related signal CSBST starts to fall until the error amplified signal EAO intersects the inductor current related signal CSBST at time t1. The power switch C is turned ON at time t1 and keeps ON for a period of constant ON time TON. The power switch C is turned OFF again at time t2, and the aforementioned operations repeat. This pure boost mode is a valley current mode.

One technical feature of the present invention is that the control circuit 300 generates two sets of constant time, i.e., a constant ON time (TON) and a constant OFF time (TOFF), to control the boost circuit 200 and the buck circuit 100 such that both the pure boost conversion mode and the pure buck mode operate with their own constant time respectively. Both conversion modes have the advantages of fast load transient response and not requiring slope compensation.

Figure 1A:
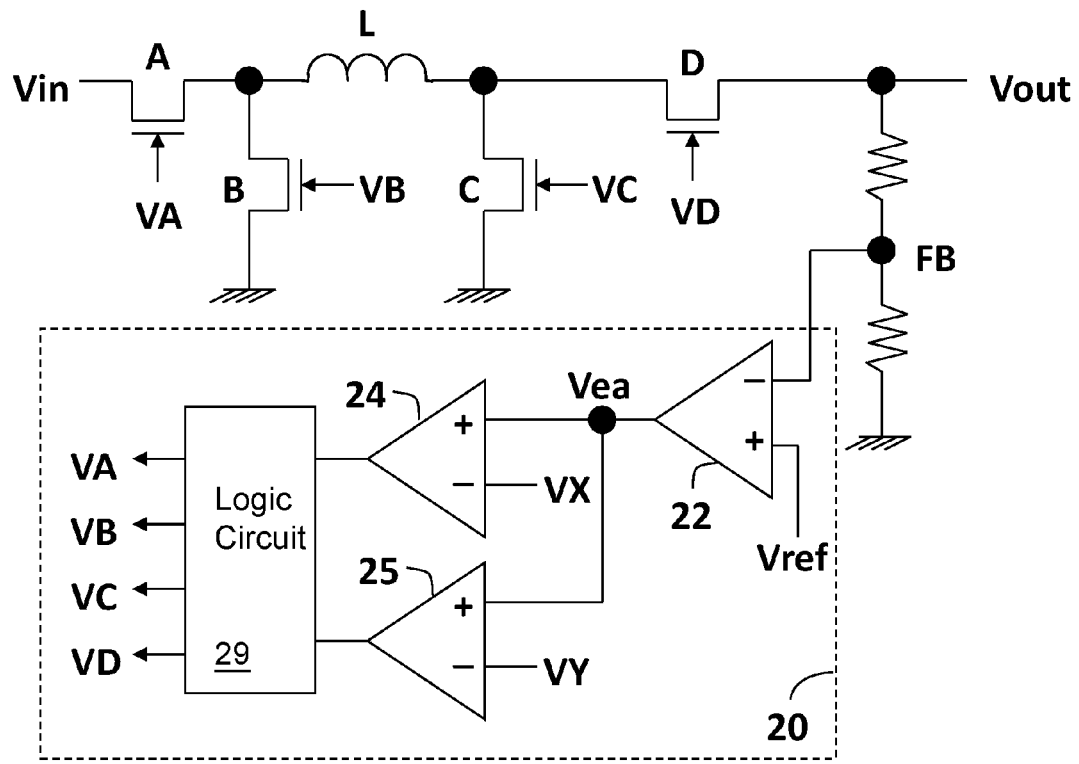
FIG. 1A shows a prior art buck-boost switching regulator and the related circuits thereof.
Figure 1B:
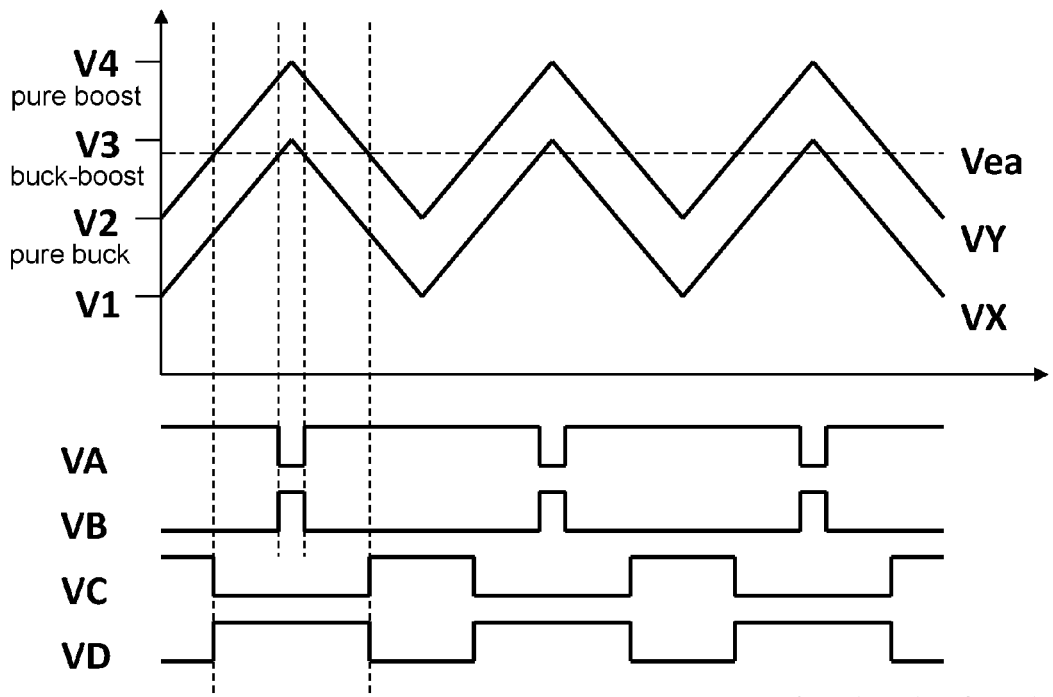
FIG. 1B shows signal waveforms corresponding to the circuits shown in FIG. 1A.
Figure 2A:
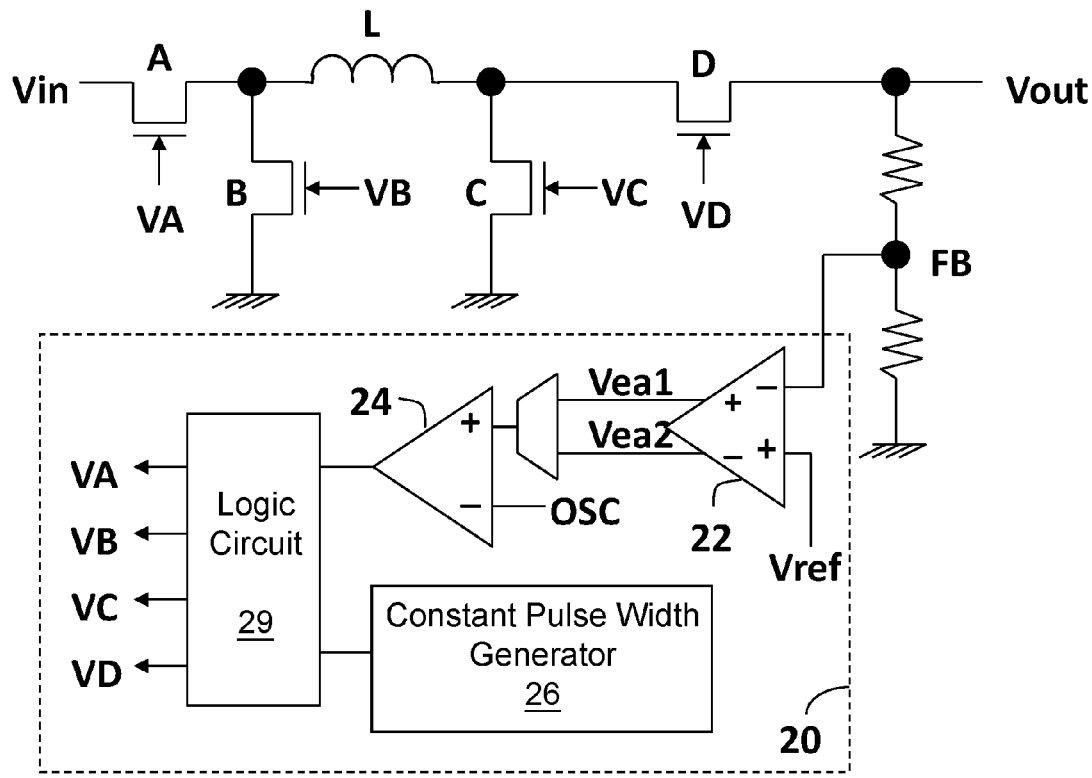
FIG. 2A shows another prior art buck-boost switching regulator.
Figure 2B:
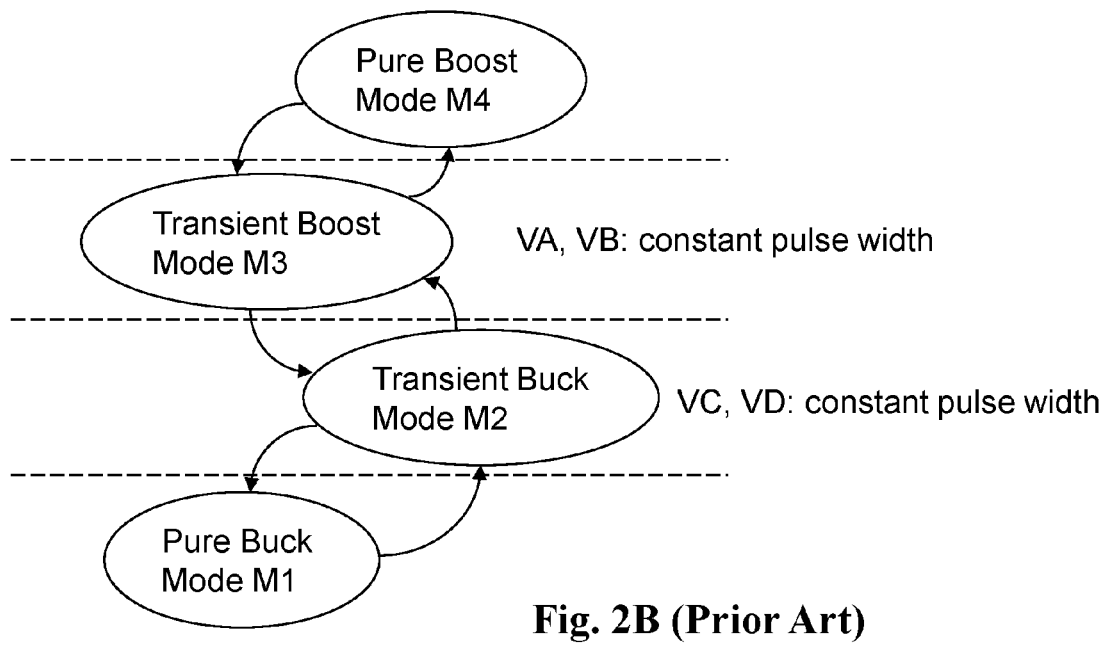
FIG. 2B shows the state machine corresponding to the buck-boost switching regulator shown in FIG. 2A.
Figure 3:
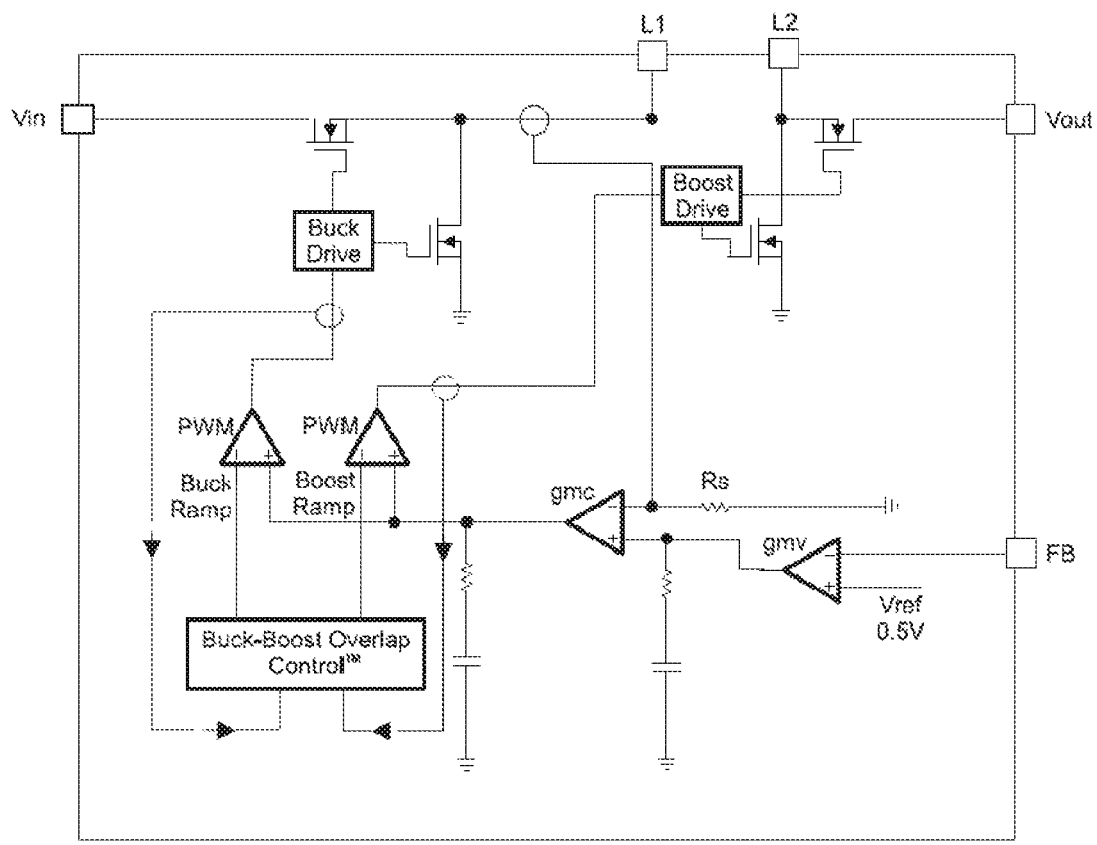
FIG. 3 shows another prior art buck-boost switching regulator and the related circuits thereof.
Figure 4A:
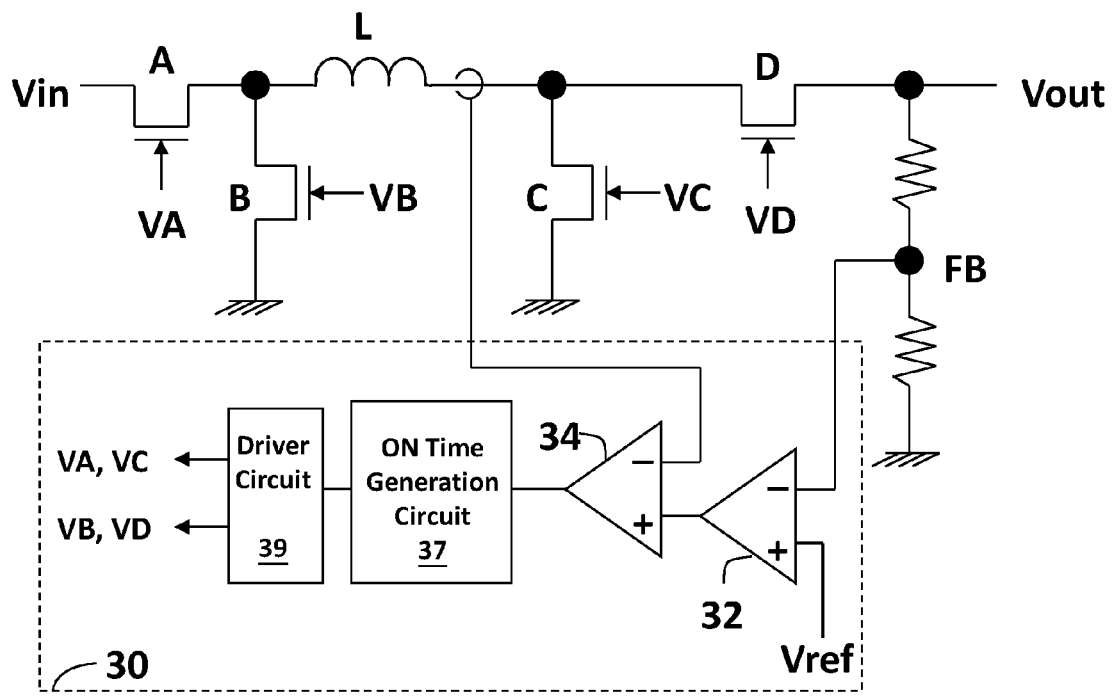
FIG. 4A shows another prior art buck-boost switching regulator and the related circuits thereof.
Figure 4B:
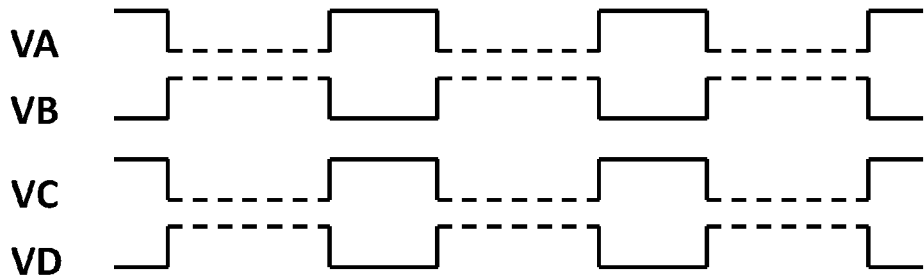
FIG. 4B shows signal waveforms corresponding to the circuits shown in FIG. 4A.
Figure 4C:
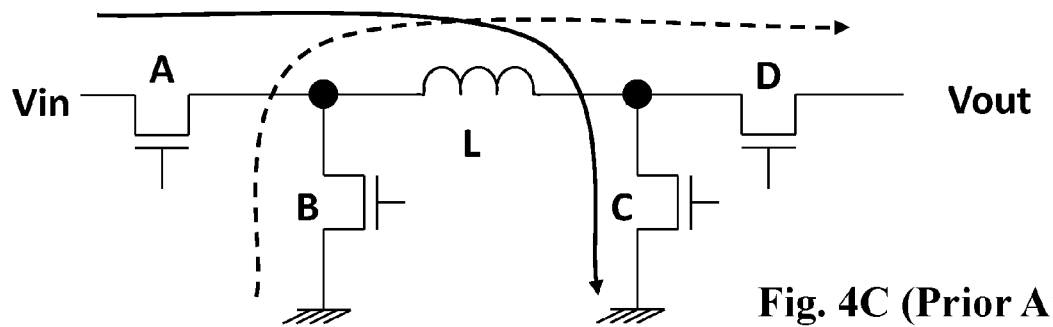
FIG. 4C shows the current directions during the operation of the buck-boost switching regulator shown in FIG. 4A.
Figure 7A:
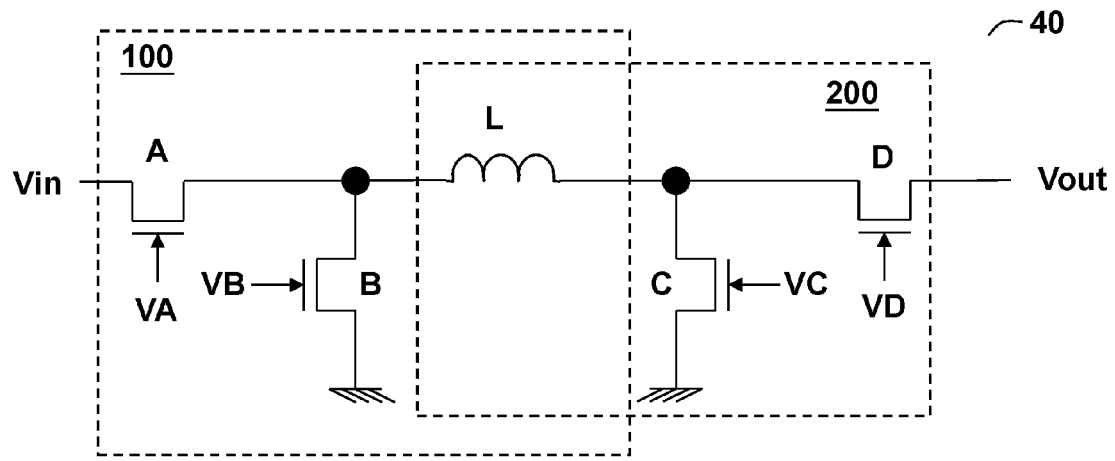
FIG. 7A shows a buck-boost power conversion stage.
Figure 7B:
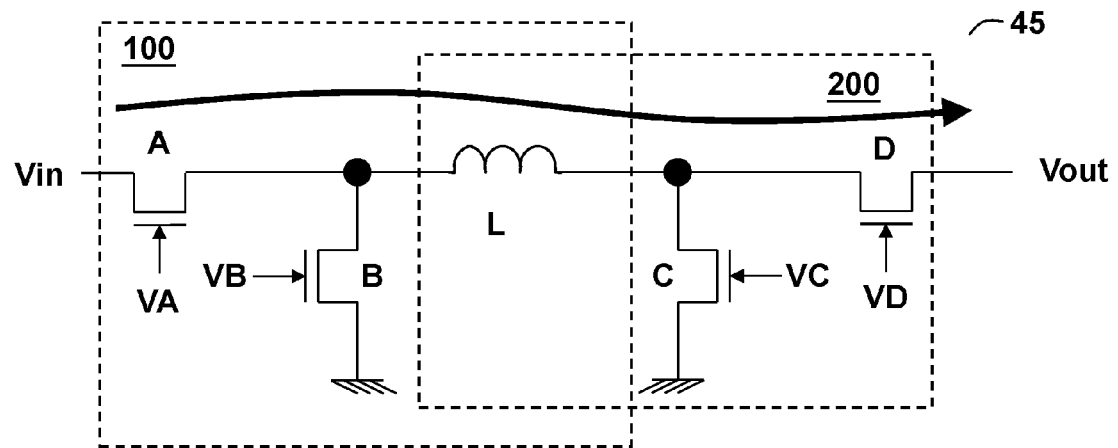
FIG. 7B shows the current direction of one embodiment of the constant time buck-boost switching regulator according to the present invention.

Referring to FIG. 7A, the buck-boost power conversion stage 40 comprises the buck circuit 100 and the boost circuit 200, wherein the buck-boost power conversion stage 40 operates in the pure buck mode when the input voltage Vin is higher than the output voltage Vout, and operates in the pure boost mode when the input voltage Vin is lower than the output voltage Vout. When the input voltage Vin is close to the output voltage Vout, preferably, it is desired for the buck-boost power conversion stage 40 not operate to in the buck-boost conversion mode as shown in FIG. 4C or 1B to reduce the switching loss. A preferable operation is as shown by the solid line in FIG. 7B, that the conduction time of the switches A, D of the buck-boost circuit 45 can be as long as possible and the buck-boost circuit 45 does not enter any transient modes nor buck-boost conversion mode. This is what the present invention achieves.

Referring to FIG. 5, another technical feature of the present invention is that the controller circuit 300 controls the buck circuit 100 according to the constant OFF time generated by the constant OFF time generator 308, and controls the boost circuit 200 according to the constant ON time generated by the constant ON time generator 312. This arrangement allows the ON time of the power switches A, D to extend as long as possible, almost without limit. More specifically, by properly setting the offset signal generated by the offset signal generator 303 to make the valley of the signal CSBST higher than the peak of the signal CSBCK (equivalent to setting the offset signal to be larger than the peak-to-valley difference of the signal CSBCK), the control circuit 300 according to the present invention can control the constant time buck-boost switching regulator 50 to operate in the buck conversion mode when the input voltage is higher than the output voltage and to operate in the boost conversion mode when the input voltage is lower than the output voltage, and further, when the input voltage is close to the output voltage, because the slope of the inductor current is very flat, by the aforementioned arrangement of the constant ON time and the constant OFF time and the setting of the offset signal, the conduction time of the power switches A and D can extend almost without limit, and the constant time buck-boost switching regulator 50 automatically operates in PFM, without requiring any extra circuit dedicated for PFM. All the aforementioned prior art buck-boost switching regulators including four power switches will have to operate in the buck-boost mode or transient buck/boost modes when the input voltage is close to the output voltage. However, the constant time buck-boost switching regulator according to the present invention can be configured in such a way that it does not require the buck-boost mode and the transient buck/boost modes, to reduce the power consumption due to switching loss.

Figure 8:
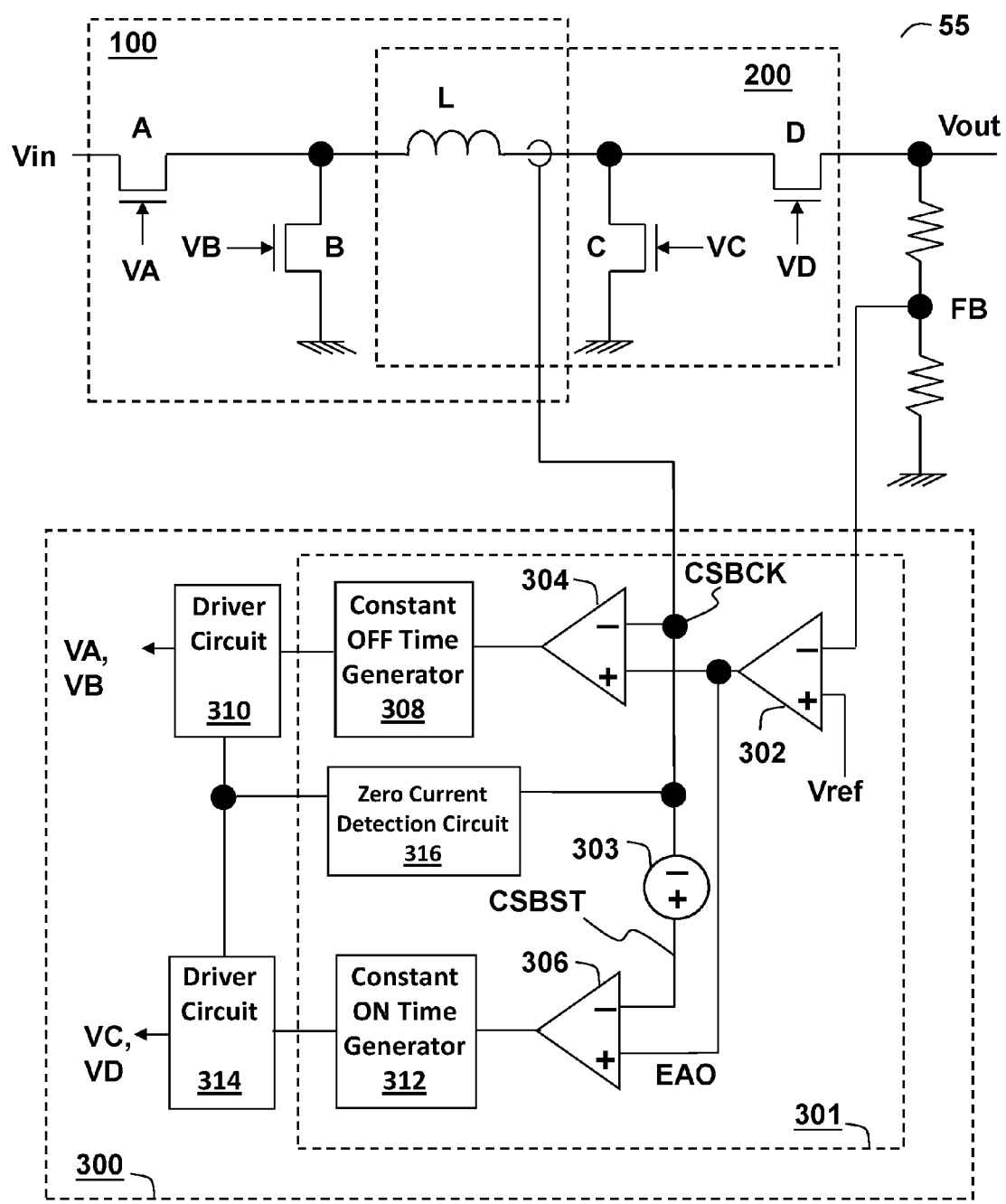
FIG. 8 shows one embodiment of the constant time buck-boost switching regulator according to the present invention.
Figure 9A:
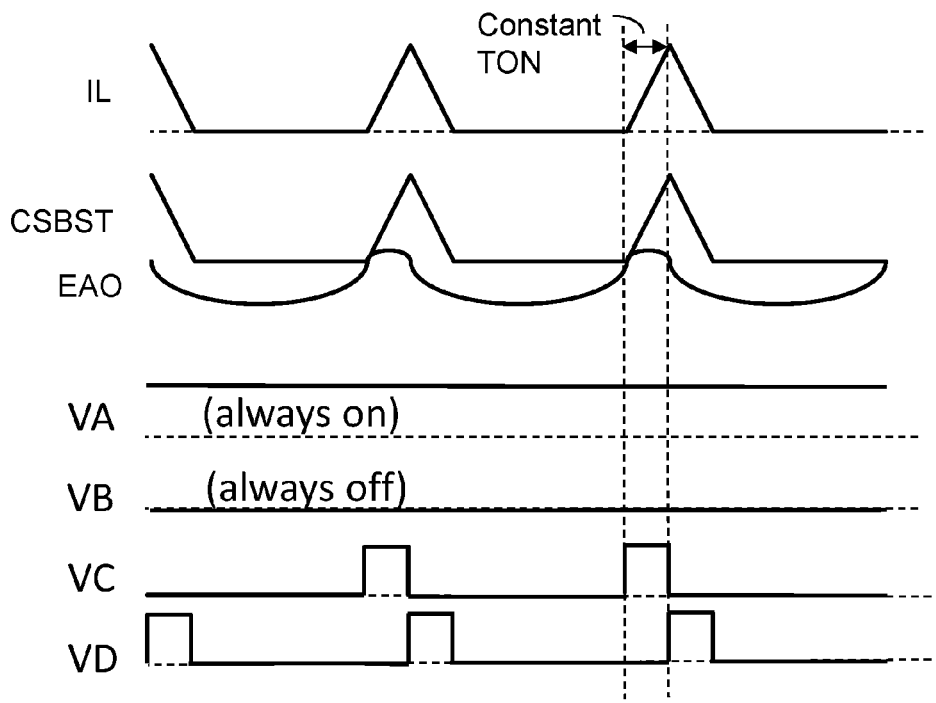
FIGS. 9A and 9B show signal waveforms corresponding to the constant time buck-boost switching regulator shown in FIG. 8.
Figure 9B:
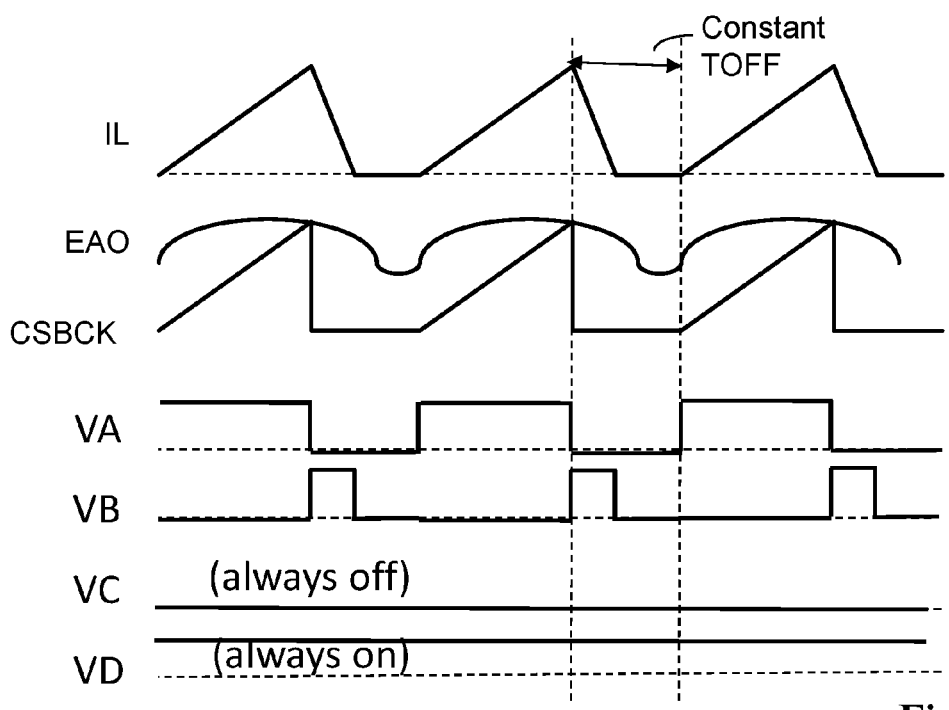

Another technical feature of the present invention is that the aforementioned control circuit of the constant time buck-boost switching regulator can be applied not only in CCM (Continuous Conduction Mode) but also in DCM (Discontinuous Conduction Mode) and PFM (Pulse Frequency Modulation). Referring to FIG. 8, by obtaining for example but not limited to a zero current signal from for example a zero current detection circuit 316, the driver circuits 310 and 314 can operate according to the zero current signal, to turn OFF the power switch B or D when the inductor current drops to zero such that the inductor current will not be negative, whereby the constant time buck-boost switching regulator 55 can be arranged to operate in DCM. FIGS. 9A and 9B show the waveforms of the control signals of the power switches A, B, C, and D, and the inductor current of the constant time buck-boost switching regulator 55 when it is operating in DCM. In addition, when the load current is low, the constant time buck-boost switching regulator 55 will automatically enter PFM mode and the operating frequency will automatically decrease, without requiring any extra complicated circuit.

Figure 10:
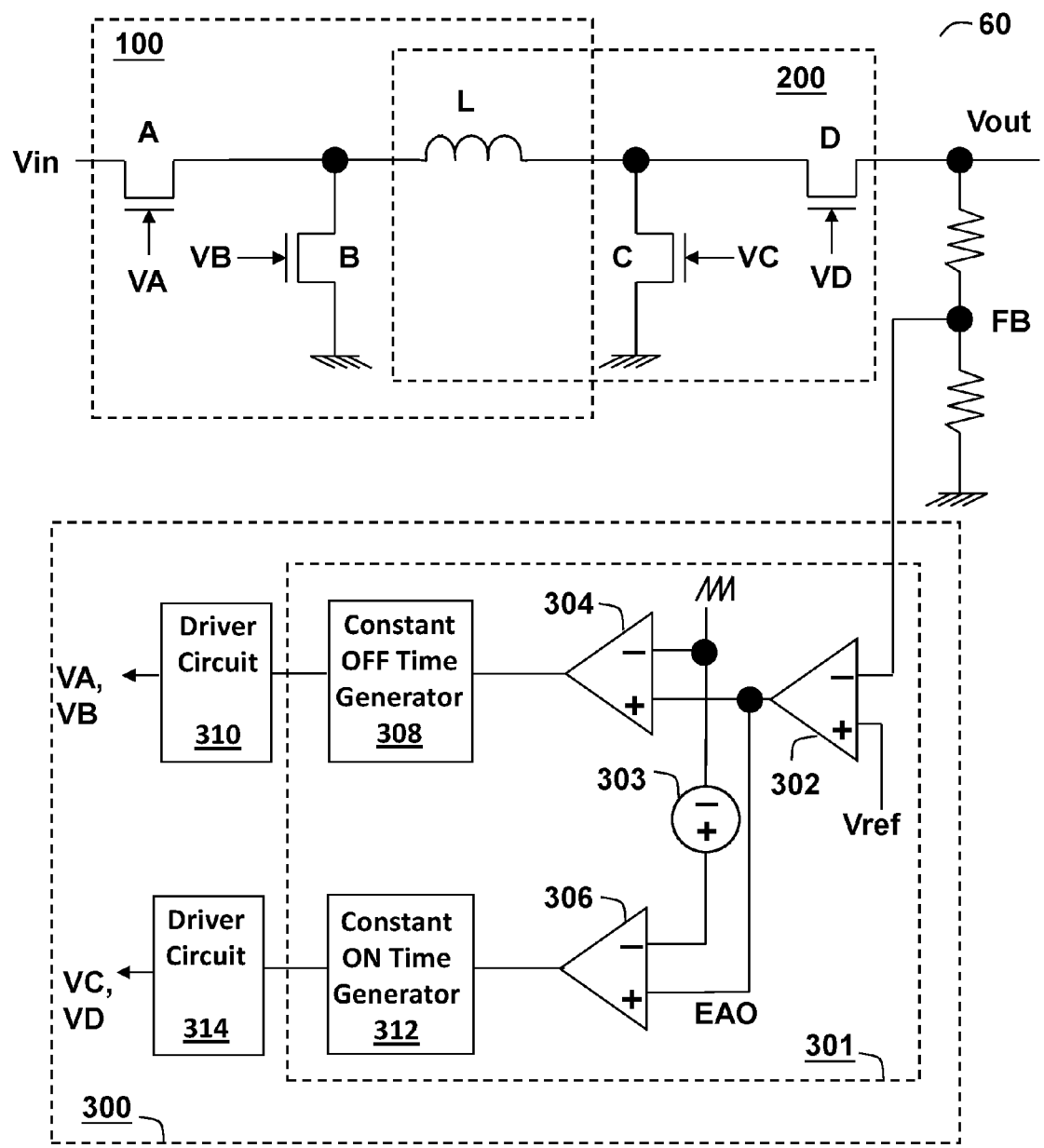
FIGS. 10 and 11 show two embodiments of the voltage mode buck-boost switching regulator according to the present invention.
Figure 11:
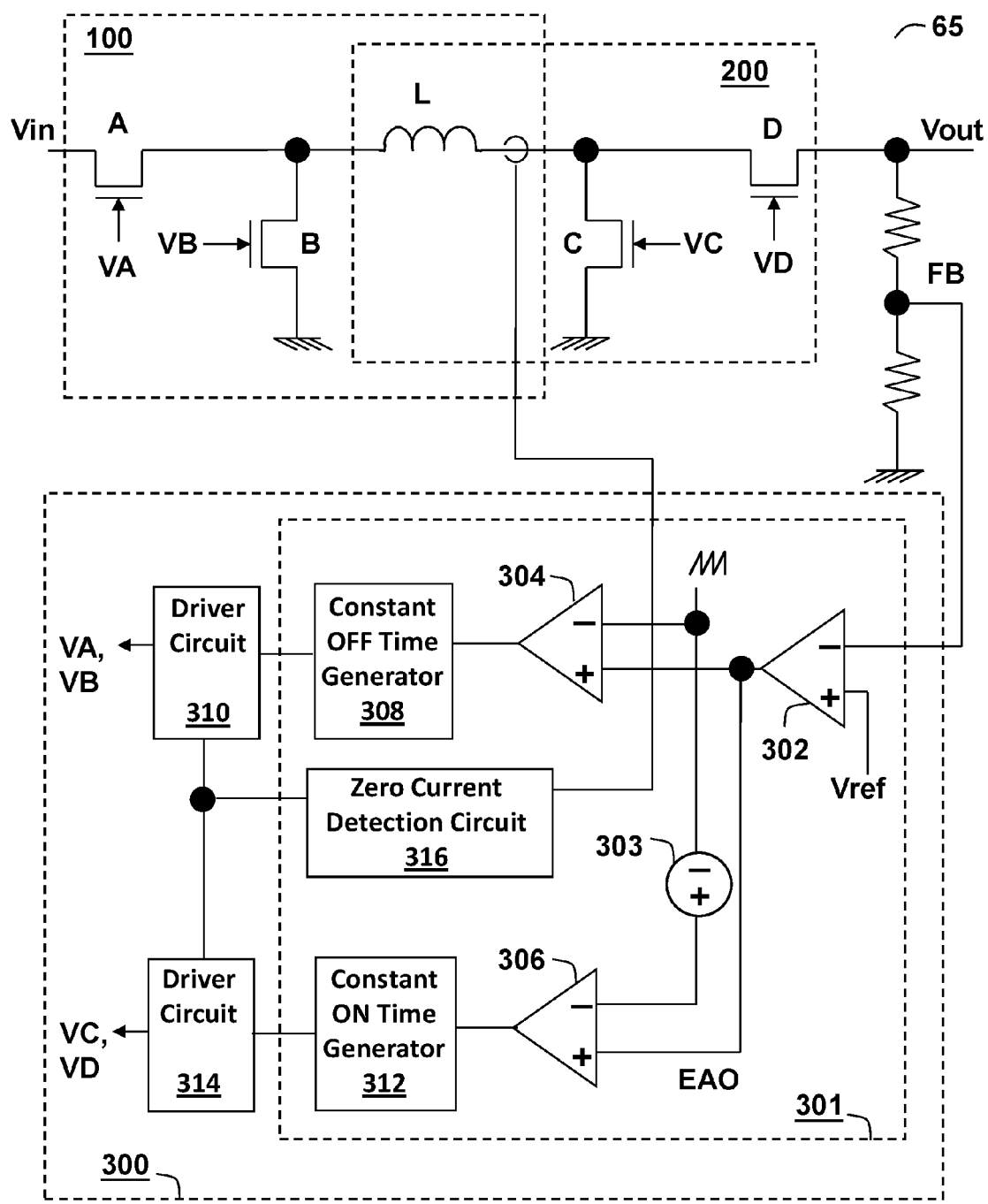

The constant time buck-boost switching regulators in FIGS. 5 and 8 are illustrated by taking current mode operation as an example. However, the present invention is also applicable to voltage mode buck-boost switching regulators. FIGS. 10 and 11 show voltage mode buck-boost switching regulators 60 and 65 for CCM and DCM respectively, wherein the PWM comparator 304 compares the error amplified signal EAO with an internally or externally generated ramp signal, and the PWM comparator 306 compares the error amplified signal EAO with a level-shifted ramp signal superposed which is the internally or externally generated ramp signal added with the offset signal generated by the offset signal generator 303. The ramp signal can be generated by various methods, which are well known by those skilled in this art. Since the methods for generating the ramp signal are not the main features of the present invention, they are not redundantly explained here.

Figure 12:
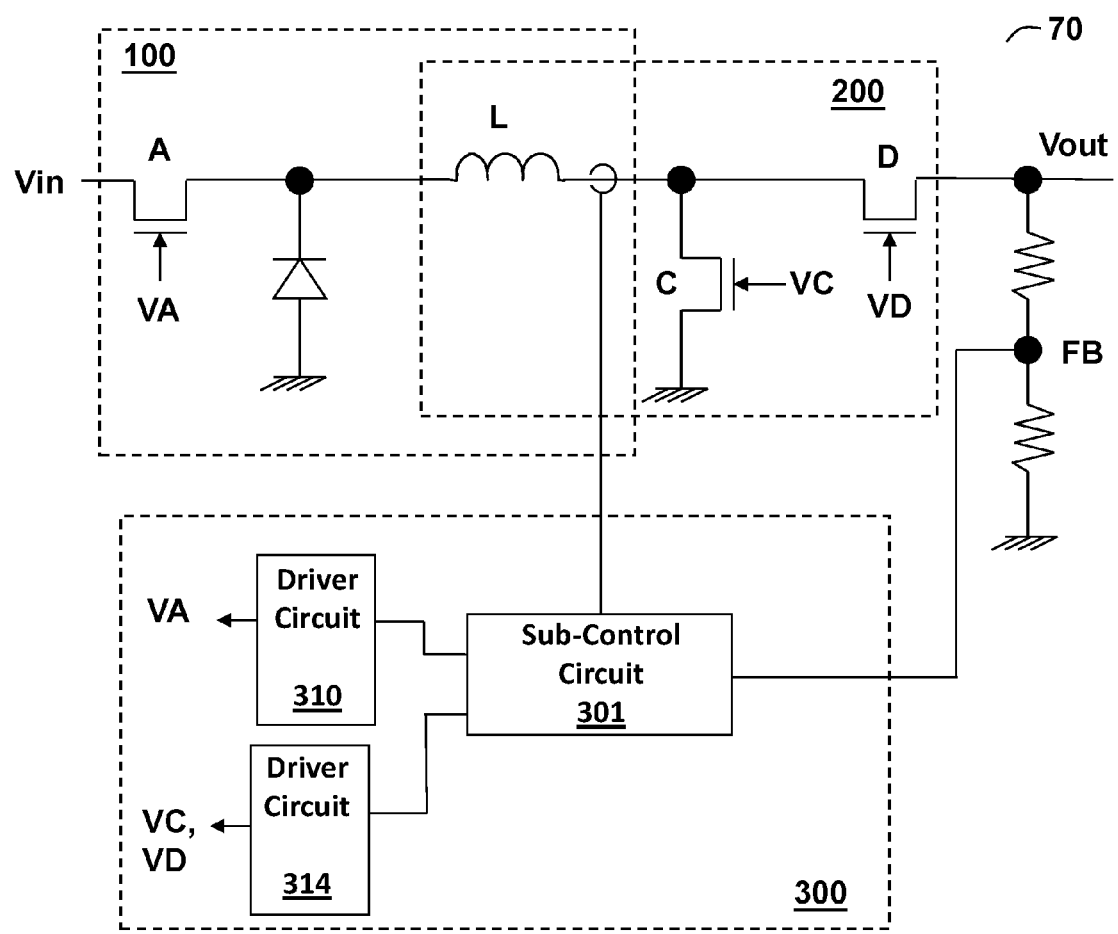
FIGS. 12-14 show several embodiments of the constant time buck-boost switching regulator according to the present invention, wherein one or more power devices are diodes.
Figure 13:
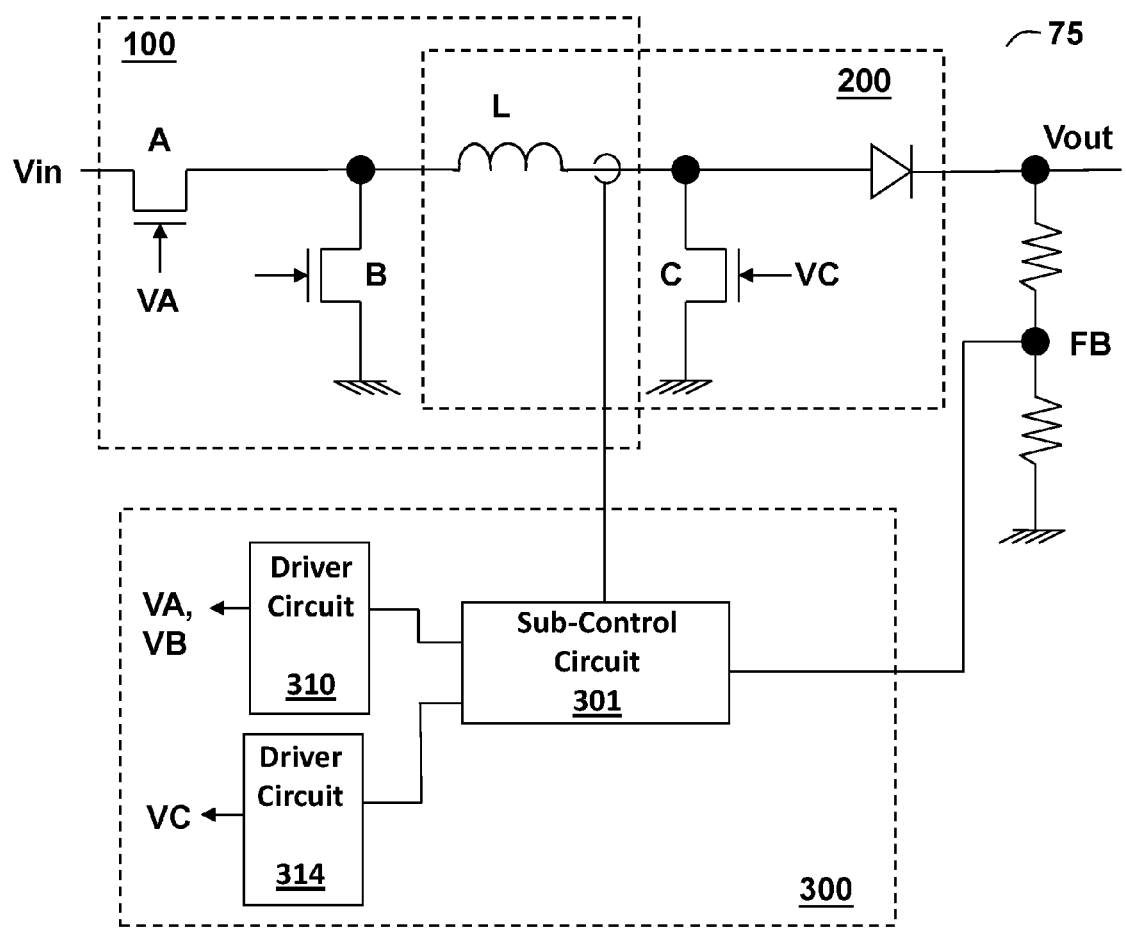
Figure 14:
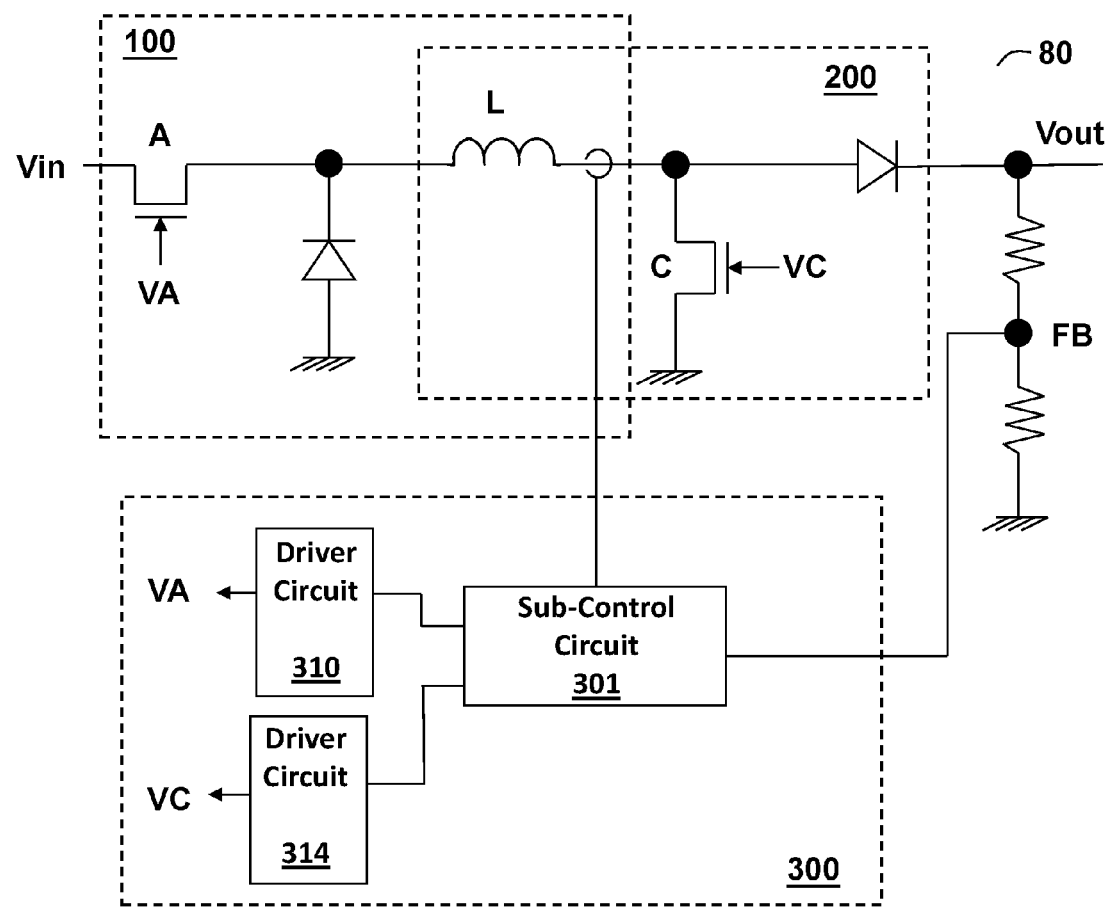

The application of the present invention is not limited to synchronous buck-boost switching regulators with four power switches. FIGS. 12-14 show various other embodiments of combinations of the boost circuit 200, the buck circuit 100 and the driver circuit 310 and 314 shown in FIGS. 5, 8, 10, and 11; wherein the sub-control circuit 301 in FIGS. 12-14 for example corresponds to, but not limited to, the sub-control circuit 301 in FIGS. 5, 8, 10, and 11. In the embodiment in FIG. 12, the power switch B is replaced by a diode. In the embodiment in FIG. 13, the power switch D is replaced by a diode. In the embodiment in FIG. 14, both the power switch B and D are replaced by diodes. All the aforementioned embodiments are applicable to operating in current mode, voltage mode, DCM, and CCM and can be controlled by the aforementioned two sets of constant ON and OFF time generated by two PWM comparators.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. For another example, the power switches A, B, C, and D can be PMOS or NMOS devices. For another example, the positive and negative inputs of the PWM comparators 304 and 306 can be swapped, with corresponding modifications to the circuits processing relevant signals; the signals CSBCK and CSBST and the polarity of the offset signal 303 can also be swapped. The spirit of the present invention should cover all such and other modifications and variations, which should be interpreted to fall within the scope of the following claims and their equivalents.

What is claimed is:

1. A constant time buck-boost switching regulator, comprising:
    a buck circuit, which includes:
        an inductor, having a first end and a second end;
        a first buck power switch, having one end coupled to the first end of the inductor and another end coupled to an input voltage; and
        a buck power device, having one end coupled to the first end of the inductor and another end coupled to ground;
    a boost circuit, which includes:
        the inductor;

a first boost power switch, having one end coupled to the second end of the inductor and another end coupled to ground; and a boost power device, having one end coupled to the second end of the inductor and another end coupled to an output voltage; and a control circuit, configured to operably generate a first constant time and a second constant time; wherein the first constant time is a constant OFF time for controlling the buck circuit such that the first buck power switch is OFF during the constant OFF time, and wherein the second constant time is a constant ON time for controlling the boost circuit such that the first boost power switch is ON during the constant ON time.

2. The constant time buck-boost switching regulator of claim 1, wherein the constant time buck-boost switching regulator operates only in a pure buck conversion mode or a pure boost conversion mode but does not operate in a buck-boost mode or a transient buck/boost mode.

3. The constant time buck-boost switching regulator of claim 1, wherein the control circuit includes:

an error amplifier circuit, configured to operably compare a feedback signal related to the output voltage with a reference voltage to generate an error amplified signal;

a first PWM comparator circuit, configured to operably compare a first inductor current related signal or a first ramp signal with the error amplified signal;

a second PWM comparator circuit, configured to operably compare a second inductor current related signal or a second ramp signal with the error amplified signal;

an offset signal generator, configured to operably generate an offset signal which is provided as a difference between the first inductor current related signal and the second inductor current related signal, or as a difference between the first ramp signal and the second ramp signal;

a first constant time generator, configured to operably generate the first constant time according to an output of the first PWM comparator;

a second constant time generator, configured to operably generate the second constant time according to an output of the second PWM comparator;

a first driver circuit, configured to operably generate a buck switch control signal to control the first buck power switch according to an output of the first constant time generator; and a second driver circuit, configured to operably generate a boost switch control signal to control the first boost power switch according to an output of the second constant time generator.

4. The constant time buck-boost switching regulator of claim 3, wherein the buck circuit, the boost circuit, the buck switch control signal and the boost switch control signal are configured to be one of the following arrangements:

(A) wherein the buck power device includes a second buck power switch and is controlled by the buck switch control signal; and
wherein the boost power device includes a second boost power switch and is controlled by the boost switch control signal;

(B) wherein the buck power device includes a buck diode having an anode coupled to ground and a cathode coupled to the first end of the inductor; and
wherein the boost power device includes a second boost power switch and is controlled by the boost switch control signal;

(C) wherein the buck power device includes a second buck power switch and is controlled by the buck switch control signal; and
wherein the boost power device includes a boost diode having an anode coupled to the second end of the inductor and a cathode coupled to the output voltage; or (D) wherein the buck power device includes a buck diode having an anode coupled to ground and a cathode coupled to the first end of the inductor; and
wherein the boost power device includes a boost diode having an anode coupled to the second end of the inductor and a cathode coupled to the output voltage.

5. The constant time buck-boost switching regulator of claim 4, wherein the buck power device includes a second buck power switch and is controlled by the buck switch control signal; wherein the boost power device includes a second boost power switch and is controlled by the boost switch control signal; and wherein the offset signal is larger than a peak-to-valley difference of the first inductor current related signal or the first ramp signal, such that:

in the pure buck conversion mode, the second buck power switch switches inversely with respect to the first buck power switch except when both of the first buck power switch and the second buck power switch are OFF in discontinuous conduction mode, and the first boost power switch is constantly ON and the second boost power switch is constantly OFF; and in the pure boost conversion mode, the second boost power switch switches inversely with respect to the first boost power switch except when both of the first boost power switch and the second boost power switch are OFF in discontinuous conduction mode, and the first buck power switch is constantly ON and the second buck power switch is constantly OFF.

6. The constant time buck-boost switching regulator of claim 4, wherein the buck power device includes a buck diode having an anode coupled to ground and a cathode coupled to the first end of the inductor; wherein the boost power device includes a second boost power switch and is controlled by the boost switch control signal; and wherein the offset signal is larger than a peak-to-valley difference of the first inductor current related signal or the first ramp signal, such that:

in the pure buck conversion mode, the first boost power switch is constantly ON and the second boost power switch is constantly OFF; and in the pure boost conversion mode, the second boost power switch switches inversely with respect to the first boost power switch except when both of the first boost power switch and the second boost power switch are OFF in discontinuous conduction mode, and the first buck power switch is constantly ON.

7. The constant time buck-boost switching regulator of claim 4, wherein the buck power device includes a second buck power switch and is controlled by the buck switch control signal; wherein the boost power device includes a boost diode having an anode coupled to the second end of the inductor and a cathode coupled to the output voltage; and wherein the offset signal is larger than a peak-to-valley difference of the first inductor current related signal or the first ramp signal, such that:

in the pure buck conversion mode, the second buck power switch switches inversely with respect to the first buck power switch except when both of the first buck power switch and the second buck power switch are OFF in discontinuous conduction mode, and the first boost power switch is constantly ON; and in the pure boost conversion mode, the first buck power switch is constantly ON and the second buck power switch is constantly OFF.

8. The constant time buck-boost switching regulator of claim 4, wherein the buck power device includes a buck diode having an anode coupled to ground and a cathode coupled to the first end of the inductor; wherein the boost power device includes a boost diode having an anode coupled to the second end of the inductor and a cathode coupled to the output voltage; and wherein the offset signal is larger than a peak-to-valley difference of the first inductor current related signal or the first ramp signal, such that:

in the pure buck conversion mode, the first boost power switch is constantly ON; and in the pure boost conversion mode, the first buck power switch is constantly ON.

9. A control circuit, which is configured to operably control a constant time buck-boost switching regulator, wherein the constant time buck-boost switching regulator comprises: a buck circuit, which includes: an inductor, having a first end and a second end; a first buck power switch, having one end coupled to the first end of the inductor and another end coupled to an input voltage; a buck power device, having one end coupled the first end of the inductor and another end coupled to ground; a boost circuit, which includes: the inductor; a first boost power switch, having one end coupled to the second end of the inductor and another end coupled to ground; a boost power device, having one end coupled the second end of the inductor and another end coupled to an output voltage; the control circuit comprising:

an error amplifier circuit, configured to operably compare a feedback signal related to the output voltage with a reference voltage to generate an error amplified signal;

a first PWM comparator circuit, configured to operably compare a first inductor current related signal or a first ramp signal with the error amplified signal;

a second PWM comparator circuit, configured to operably compare a second inductor current related signal or a second ramp signal with the error amplified signal;

an offset signal generator, configured to operably generate an offset signal which is provided as a difference between the first inductor current related signal and the second inductor current related signal, or as a difference between the first ramp signal and the second ramp signal;

a first constant time generator, configured to operably generate a first constant time according to an output of the first PWM comparator;

a second constant time generator, configured to operably generate a second constant time according to an output of the second PWM comparator;

a first driver circuit, configured to operably generate a buck switch control signal to control the first buck power switch according to an output of the first constant time generator; and a second driver circuit, configured to operably generate a boost switch control signal to control the first boost power switch according to an output of the second constant time generator;

wherein the first constant time is a constant OFF time for controlling the buck circuit such that the first buck power switch is OFF during the constant OFF time, and wherein the second constant time is a constant ON time for controlling the boost circuit such that the first boost power switch is ON during the constant ON time.

10. The control circuit of claim 9, wherein the offset signal is larger than a peak-to-valley difference of the first inductor current related signal or the first ramp signal, such that the constant time buck-boost switching regulator operates only in a pure buck conversion mode or a pure boost conversion mode but does not operate in a buck-boost mode or a transient buck/boost mode.

11. A method for controlling a constant time buck-boost switching regulator, wherein the constant time buck-boost switching regulator comprises: a buck circuit, which includes: an inductor, having a first end and a second end; a first buck power switch, having one end coupled to the first end of the inductor and another end coupled to an input voltage; a buck power device, having one end coupled the first end of the inductor and another end coupled to ground; a boost circuit, which includes: the inductor; a first boost power switch, having one end coupled to the second end of the inductor and another end coupled to ground; a boost power device, having one end coupled the second end of the inductor and another end coupled to an output voltage; the method comprising:

generating a first constant time and a second constant time;

controlling the buck circuit with the first constant time; and controlling the boost circuit with the second constant time;

wherein the first constant time is a constant OFF time for controlling the buck circuit such that the first buck power switch is OFF during the constant OFF time, and wherein the second constant time is a constant ON time for controlling the boost circuit such that the first boost power switch is ON during the constant ON time.

12. The method of claim 11, wherein the step of generating the first constant time and the second constant time includes:

comparing a feedback signal related to the output voltage with a reference voltage to generate an error amplified signal to generate a first comparing output;

comparing a first inductor current related signal or a first ramp signal with the error amplified signal;

adding an offset signal to the first inductor current related signal or the first ramp signal to generate a second inductor current related signal or a second ramp;

comparing the second inductor current related signal or the second ramp signal with the error amplified signal to generate a second comparing output;

generating a first constant time according to the first comparing output; and generating a second constant time according to the second comparing output.

13. The method of claim 12, wherein the offset signal is larger than a peak-to-valley difference of the first inductor current related signal or the first ramp signal, such that the constant time buck-boost switching regulator operates only in a pure buck conversion mode or a pure boost conversion mode but does not operate in a buck-boost mode or a transient buck/boost mode.

* * * * *